United States Patent [19]

Ishii et al.

[11] Patent Number: 4,734,720

[45] Date of Patent: Mar. 29, 1988

[54] ELECTROSTATIC RECORDING APPARATUS WITH IMPROVED RECORDING ELECTRODE

[75] Inventors: Akihiko Ishii, Tokyo; Mikio Amaya, Kawasaki; Junzo Nakajima, Yokohama; Kunihiko Sato, Funabashi, all of Japan

[73] Assignee: Fujitsu Limited, Kanagawa, Japan

[21] Appl. No.: 886,474

[22] Filed: Jul. 17, 1986

[30] Foreign Application Priority Data

Jul. 18, 1985 [JP] Japan ............ 60-156909
Sep. 25, 1985 [JP] Japan ............ 60-213125
Sep. 25, 1985 [JP] Japan ............ 60-213126
Sep. 25, 1985 [JP] Japan ............ 60-213127

[51] Int. Cl.$^4$ ............ G01D 15/10
[52] U.S. Cl. ............ 346/155; 346/160.1
[58] Field of Search ............ 346/155, 139 C, 74.5, 346/160.1; 400/119; 101/DIG. 5; 358/301

[56] References Cited

U.S. PATENT DOCUMENTS 4,394,671 7/1983 Erickson ............ 346/155

FOREIGN PATENT DOCUMENTS 0055599 7/1982 European Pat. Off. ............ 346/155

OTHER PUBLICATIONS

Japanese Patent Abstracts, vol. 7, No. 63, (M-200) [1208], Mar. 16, 1983; & JP-A-57 208 266 (Matsushita Densou Kiki K.K.).
Japanese Patent Abstract, vol. 9, No. 194, (M-403) [1917], Aug. 10, 1985 & JP-A-60 058 875 (Matsushita Densou K.K.).
Japanese Patent Abstracts, vol. 7, No. 246, (M-253) [1391], Nov. 2, 1983, & JP-A-58 132 570 (Canon K.K.).
Japanese Patent Abstracts, vol. 9, No. 239, (p-391) [1962], Sep. 25, 1985 & JP-A-60 091 370 (Canon K.K.).
Japanese Patent Abstracts, vol. 7, No. 184, (p-216) [1329], Aug. 13, 1983; & JP-A-58 85 452 (Matsushita Densou Kiki K.K.).

*Primary Examiner*—A. Evans
*Attorney, Agent, or Firm*—Armstrong, Nikaido, Marmelstein & Kubovcik

[57] ABSTRACT

An electrostatic recording apparatus is provided which comprises a recording electrode with a plurality of stylus electrodes and a developing device with a back electrode provided on opposite sides of a recording medium. The recording apparatus is capable of simultaneously processing the forming of and development of a latent image by using the recording electrode which has a magnetic piece embedded at a tip portion thereof. A magnetic field is concentrated in its path and is increased in a narrow gap region between the recording electrode and the back electrode. Toner chains of magnetic particles in the developing process can easily stand upright on the back electrode, and can thus easily and uniformly contact the recording medium. Dot defects on a formed image, are therefore, avoided. The present invention is directed to several embodiments of the magnetic piece and the manner of embedding the magnetic piece in the recording electrode.

16 Claims, 20 Drawing Figures

ELECTROSTATIC RECORDING APPARATUS WITH IMPROVED RECORDING ELECTRODE

BACKGROUND OF THE INVENTION

1. Field of the Invention

The present invention relates to an electrostatic recording apparatus for printing on a recording medium using stylus electrodes and a magnetic brush. More particularly, this invention relates to an apparatus using a direct imaging method, which performs the latent image forming process and the developing process simultaneously on a recording medium. The apparatus is used for a printer, a facsimile, or a display.

2. Description of the Prior Art

In a field of electrographics, an electrostatic recording method using stylus electrodes and a magnetic brush is known as a method with high speed and low noise. In this prior art recording method, the latent image forming process and the developing process have been isolated. Subsequently an apparatus, having a structure for performing simultaneous processing of the latent image forming and developing, has been introduced with the object of attaining the compactness of the apparatus.

The structure and recording principle of the simultaneous processing are explained in accordance with FIGS. 1 through 4. Throughout the drawings, the same reference numerals and characters designate and identify the same or similar parts.

FIG. 1 is a perspective view of an assembly of the electrostatic recording apparatus for a latent image forming process and a developing process. The recording electrode 1, includes a plurality of stylus electrodes 2 implanted in a line and molded in an insulating material, and a back electrode 7 of multiple segments facing the electrode 1 with a specified narrow gap between them. Back electrode 7 is formed on an insulating film 8 upon a fixed cylindrical sleeve 4. The recording medium 3, for example a sheet, passes through the narrow gap contacting the recording electrode 1.

A developing device 9, which comprises a rotating magnet roller 5, a fixed sleeve 4 and a magnetic toner 6, form a well-known magnetic brush. Two types of structure for the magnetic brush have been used, one is a fixed sleeve and a rotating magnet roller type, and the other is a rotating sleeve and a fixed magnet roller types. The present invention relates to the former type, and this type has a particular feature of making electrical contact with the back electrode 7 easy, and is used in the following explanation.

With the rotation of the magnet roller 5, the magnetic toner 6 is transported on the surface of the sleeve 4, forming a brush-like toner sheath with undulations. The movement of the toner 6 in accordance with the rotation of the magnet roller 5 is schematically shown in FIGS. 2(*a*) and 2(*b*). The undulation of toner movement, which causes a problem is referred to later.

The recording mechanism is more clearly understood using FIG. 3, which shows a partial cross sectional view of an assembly composed of the developing device 9, one of the stylus electrodes 2 (the molding material of the stylus electrode is not shown here) and the recording medium 3 running therebetween.

With a rotation of magnet roller 5, a magnetic toner is transported on a surface of the sleeve 4, and is carried on the back electrode 7 formed on the insulating film 8. Pulse voltages of mutually opposite polarity are applied to the stylus electrode 2 and the back electrode 7 in accordance with the image signals. When the magnet roller 5 rotates and the center of an N pole, for example, faces the stylus electrode 2, the magnetic toner 6 forms a crest of the undulation and builds up a tower-like head, which is formed from a multiple of the microscopic toner particle chains.

The head particle 61 of the magnetic toner chain, which is charged negative in this case by the application of the negative pulse voltage, touches the front side 31 of the recording medium 3. On the other hand, the positive charges 10 are imparted to the back side 32 of the recording medium 3 as a result of a discharge between the stylus electrode 2 and the recording medium 3. When an attractive force between the positive charges 10 and the negatively charged magnetic toner 62 is stronger than the magnetic force from the magnet roller 5, the required toner images in accordance with applied image signals are formed on the recording medium 3.

FIG. 4 illustrates schematically a cross-sectional view of the electrostatic recording apparatus. For the sake of clarity, the parts which are not necessary to explain the principle of operation have been omitted. The recording medium 3, consisting of an insulating film, formed like a belt, is rotated at a constant speed by three rollers 111, 112 and 113. The recording electrode 1 is provided inside of the belt shaped recording medium 3 and is in close contact therewith. The developing device, which comprises the back electrodes 7 and the magnetic brush forming means, is provided facing the recording electrode 1 via the recording medium 3.

After the toner images are formed on the recording medium 3 as explained in FIG. 3, the recording medium 3 is further rotated to a transfer position 15. A recording paper 12 is provided to run in the direction of the arrow A and is brought into contact with the front side of the recording medium 3 with the aid of the roller 112 in co-operation with a mechanism of a transfer roller 13. The transfer roller 13 is made of an electrically conductive material such as a conductive rubber and is connected to a positive terminal of a power supply 18. The roller 13 has the function of attracting a negatively charged toner particle 62 onto the recording paper 12. In some cases a corona discharger, which electrically charges a back side of the recording paper 12 to attract the toner particles, is used instead of the transfer roller 13.

Thereafter, the recording paper is moved to a fixing device 14 and the transferred images are permanently bonded by conventional fixing techniques such as pressure, heat, or combinations thereof.

The recording medium 3 is further rotated to an erasing position, and is passed through two corona dischargers 16 and 17. Each wire electrode of the corona dischargers 16 and 17 is impressed with a high AC voltage of the opposite polarity. The corona dischargers have the function of erasing the remaining charges on both sides 31 and 32 of the recording medium 3 and neutralizing the magnetic toner particles thereon. The electrically neutralized magnetic toner particles are collected in a developer or a reservoir (not shown in FIG. 4) and the recording medium is again used for recording.

The principle of the above mentioned electrostatic recording apparatus, utilizing the simultaneous processing of the image forming and developing thereof, is disclosed, for example, in U.S. Pat. No. 3,816,840, issued to Arthur R. Kotz on June 11, 1974.

However, the above patent provides a fixed cylindrical magnet arrangement and a rotating outer sleeve. On the other hand, the structure illustrated in FIGS. 1 through 4 comprises the fixed sleeve 4 and rotating magnet roller 5, because in order to have good contact with a multiple of back electrodes 7, it is necessary to form the back electrodes on the fixed sleeve 4.

The embodiments utilizing the rotating magnet roller and fixed sleeve (which are referred to as the fixed sleeve type hereinafter) are described in U.S. Pat. No. 4,396,927, issued to Mikio Amaya et al, on Aug. 2, 1983, which is concerned with a proper gap discharge between the recording electrode and the recording medium.

The apparatus as illustrated in FIG. 4 has the special feature of using the recording medium 3 repeatedly and the simultaneous process of forming and developing the required images. Therefore, the structure of the equipment is simplified, small-sized and can be fabricated at a low cost.

As for the recording medium, the above mentioned U.S. Pat. No. 4,396,927 recommends the two layer composition, consisting of a base material layer and an uneven layer thereon, to keep a proper gap between the recording electrode and the recording medium. The material for the layer may be selected from polyester, polyethylene, polyvinyl chloride, etc.

In the fixed sleeve type described above, a problem of periodical and repeated dot defects of the formed images has however been found. It will be explained in more detail using FIG. 5.

FIGS. 5(*a*) and 5(*b*) show a cross-sectional view of the magnetic brush, stylus electrode and the recording medium schematically in a simplified form. For the sake of clarity, two pairs of magnetic poles are used. The toner particles 61 are chained and stand upright in the center region of each magnetic pole. However, in the boundary region between two adjacent magnetic poles, toner particles 63 lie down being chained on the sleeve 4 along the magnetic flux stretching between two adjacent magnetic poles. When the center of the magnetic pole faces the stylus electrode 1 as shown in FIG. 5(*a*), the chained tip of the magnetic toner 63 touches the front side 31 of the recording medium 3.

However, when the magnetic roller 5 rotates further and the boundary region between poles faces the recording electrode 1 as shown in FIG. 5(*b*), the chained tip of the magnetic toner 63 comes apart from the recording medium 3. This phenomena results in dot defects in the image pattern on the recording medium.

The dot defects above described mean a dropping out, in other words, a slipping off, or a shading of the formed toner image. These appear periodically and repeatedly on the recording medium. These defects will be referred to as the dot defects.

SUMMARY OF THE INVENTION

It is a principal object of the present invention to provide an electrostatic recording apparatus, of a fixed sleeve type, which is capable of eliminating dot defects of an image and forms a uniform image on a recording medium in a developing process.

The dot defects of the image are caused by the undesirable formation of the magnetic chain lying down along the surface of a fixed sleeve and being unable to reach the recording medium as has been described above. This is caused essentially by an inadequate shape or distribution of the magnetic flux formed in the gap between the recording electrode and the fixed sleeve. This problem, therefore, can be solved if the shape or distribution of the magnetic flux is corrected such that the flux in the gap is arranged to have more components in the radial direction and to be concentrated at the tip of the stylus electrode. This correction of the magnetic flux can be effected using a magnetic piece properly located in the adjacent portion of the tip of the recording electrode.

In practice, one or two pieces of a magnetic material are embedded and molded in a top portion of a recording electrode. The molding material, which comprises the stylus electrodes, is partially removed from the recording electrode, the removed portion being in parallel to the direction of the implantation of the stylus electrodes and adjacent thereto. One or two pieces of magnetic material are embedded into the removed portion, either completely or partially filling the space. Thus, regardless of the rotating position of the magnetic brush, the present invention makes it possible for the chained toner particles to stand straight on the fixed sleeve and to touch the recording medium.

As for the method of embedding a piece of magnetic material into the recording electrode (which is referred to as the magnetic piece hereinafter), the present invention discloses several embodiments.

The first embodiment of the present invention has the following structure. A magnetic piece is embedded in parallel to the array of the stylus electrodes, and is formed on one side of the stylus electrodes. The cross-section of the magnetic piece has the same symmetrical profile as that of the molding portion of the recording electrode on the other side of the stylus electrodes.

The second embodiment of the present invention has a similar shape of the magnetic piece as that of the first embodiment, but it is recessed from the top of the recording electrode, so the magnetic piece is prevented from contacting the recording medium. The second embodiment also prevents the recording medium from being deposited with abraded powders of the magnetic piece, thus it eliminates blurring and fogging of the recorded image. The embodiment also includes several modifications of the magnetic piece.

The third embodiment of the present invention has a similar shape of the magnetic piece as that of the second embodiment, but the magnetic piece is buried and covered completely with the molding material to avoid the blurring and fogging of the recorded image as mentioned in the second embodiment.

The fourth embodiment of the present invention has two magnetic pieces of different width and arranged in parallel to the stylus electrode array. The magnetic pieces are located on both sides of the stylus electrode array and adjacent thereto.

These embodiments described above with other objects and advantages will become apparent to one skilled in the art from a reading of the following disclosure, the appending claims and the accompanying drawings.

DETAILED DESCRIPTION OF THE PREFERRED EMBODIMENTS

Figure 1:
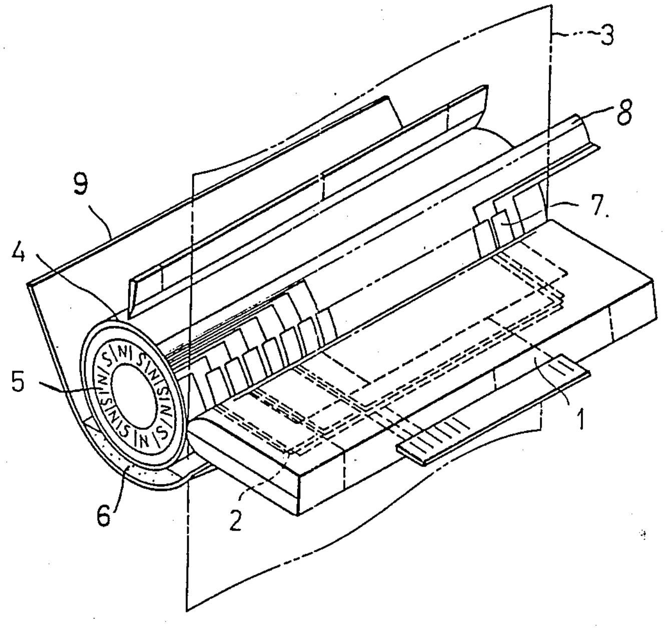
FIG. 1 is a schematic perspective view of an electrostatic recording apparatus for simultaneous processing of latent image forming and developing.
Figure 2:
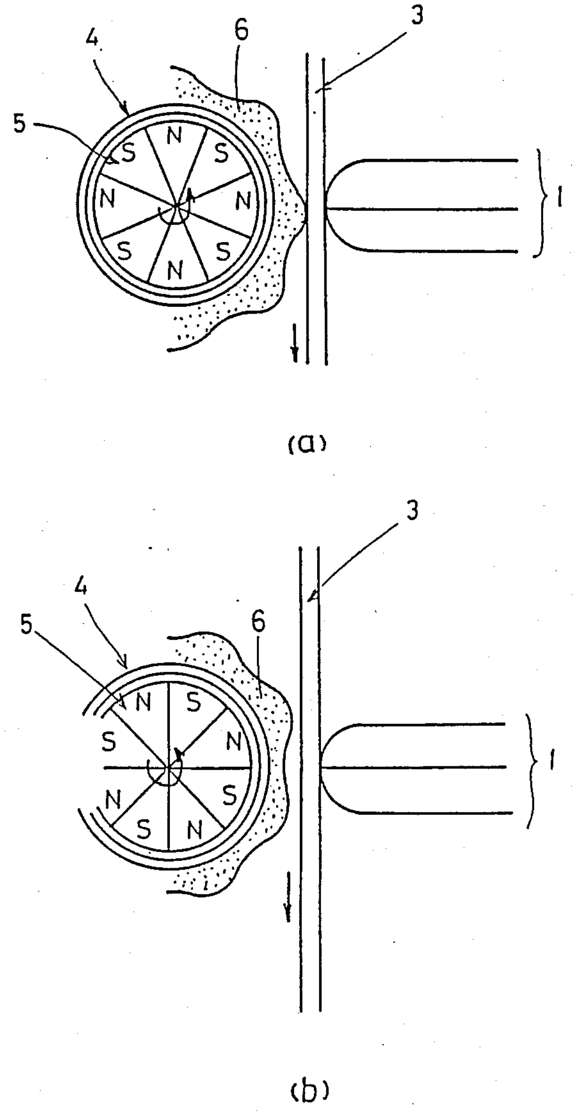
FIG. 2 PRIOR ART
FIG. 2 illustrates schematically the movement of magnetic toner with regard to the rotation of a magnet roller, forming a magnetic brush.
Figure 3:
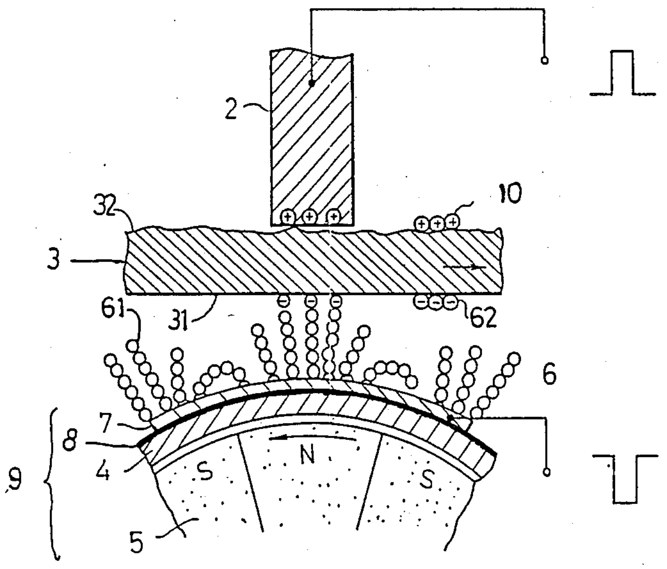
FIG. 3 PRIOR ART
FIG. 3 shows a partial cross-sectional view of a developing device, a stylus electrode and a recording medium to explain the principle of the simultaneous processing of latent forming and developing.
Figure 4:
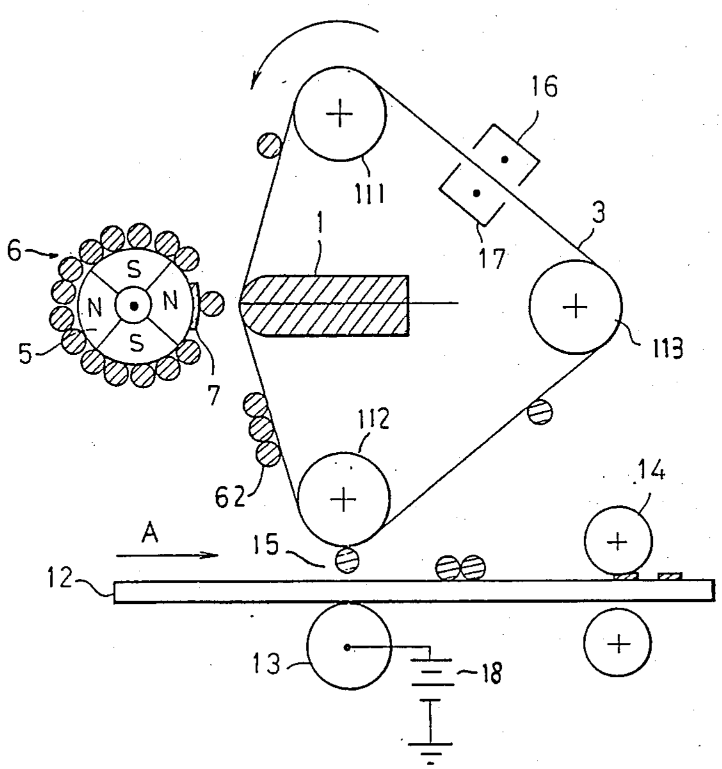
FIG. 4 illustrates schematically a cross-sectional view of an electrostatic apparatus to explain the mechanism of recording.
Figure 5:
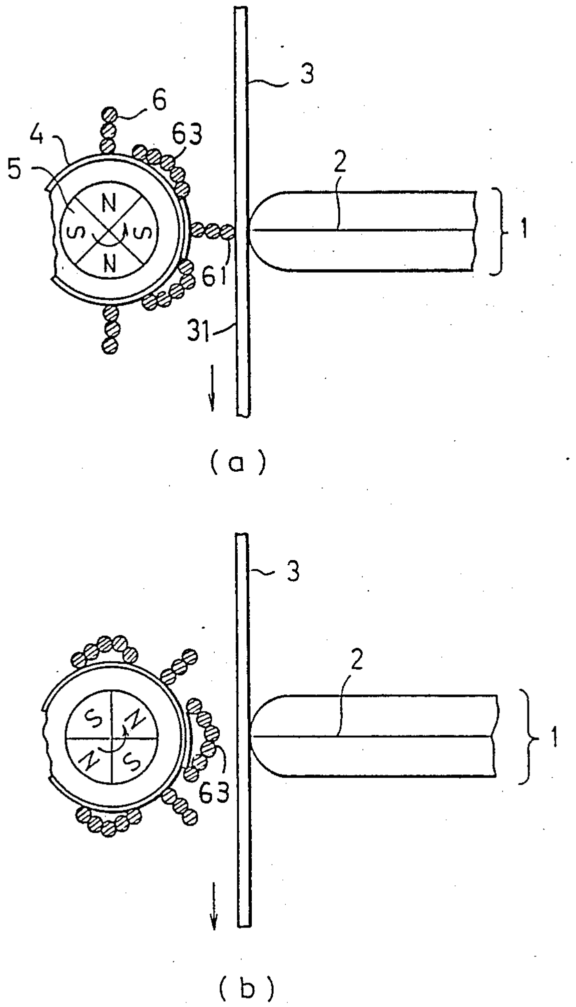
FIG. 5 PRIOR ART
FIG. 5 illustrates schematically the movement of toner, forming dot defects in a recorded image with the rotation of a magnet roller in the prior art.

Referring to the drawings of the preferred embodiments, the same or like reference numerals and characters are used to identify similar or corresponding parts in the prior art of FIG. 1 through FIG. 5.

Figure 6:
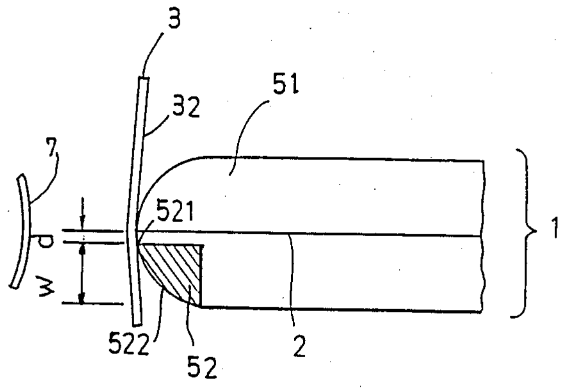
FIG. 6 is a cross-sectional view of a recording electrode for a first embodiment of the present invention.

In FIG. 6, a cross-sectional view of a recording electrode of a first embodiment is shown, the other parts and constructions of the electrostatic recording apparatus are the same as those explained in relation to the prior art. In the central plane of the recording electrode 1, a plurality of stylus electrodes 2 are implanted in a molding material 51. In FIG. 6, one of the stylus electrodes is shown. Both the upper and lower molding material extend perpendicular to the plane of FIG. 6, and there is a narrow gap between the surfaces thereof. As for the molding material, an insulating and moldable resin, such as epoxy, phenol or acrylic resin, etc., is used. Moreover, glass powder may be mixed with it to reinforce the strength thereof.

A molding material in the left, lower portion of the recording electrode is removed mechanically and a magnetic piece 52, which is made of a soft magnetic material, such as iron, silicon steel, permalloy, or other soft magnetic alloy, is embedded as shown in FIG. 6. A soft magnetic material is characterized by the property of a high permeability and a low hysteresis loss.

The shape and dimensions of the magnetic piece are such that a distance d between the center line of the stylus electrode 2 and the edge 521 of the magnetic piece and a width w thereof are, for example, as 0.3 mm and 5 mm respectively. A cross-sectional profile of the outer surface 522 forms a continuous curve symmetrical about the stylus electrode 2. Generally, the magnetic piece extends over the full length of the array of stylus electrodes, and therefore, has a shape like a long bar. However, this is not an indispensable condition, the magnetic piece may be divided into plural pieces of bar, forming one long bar perpendicular to the the plane of FIG. 6. This idea is also applicable to all subsequent embodiments of the present invention.

Figure 7:
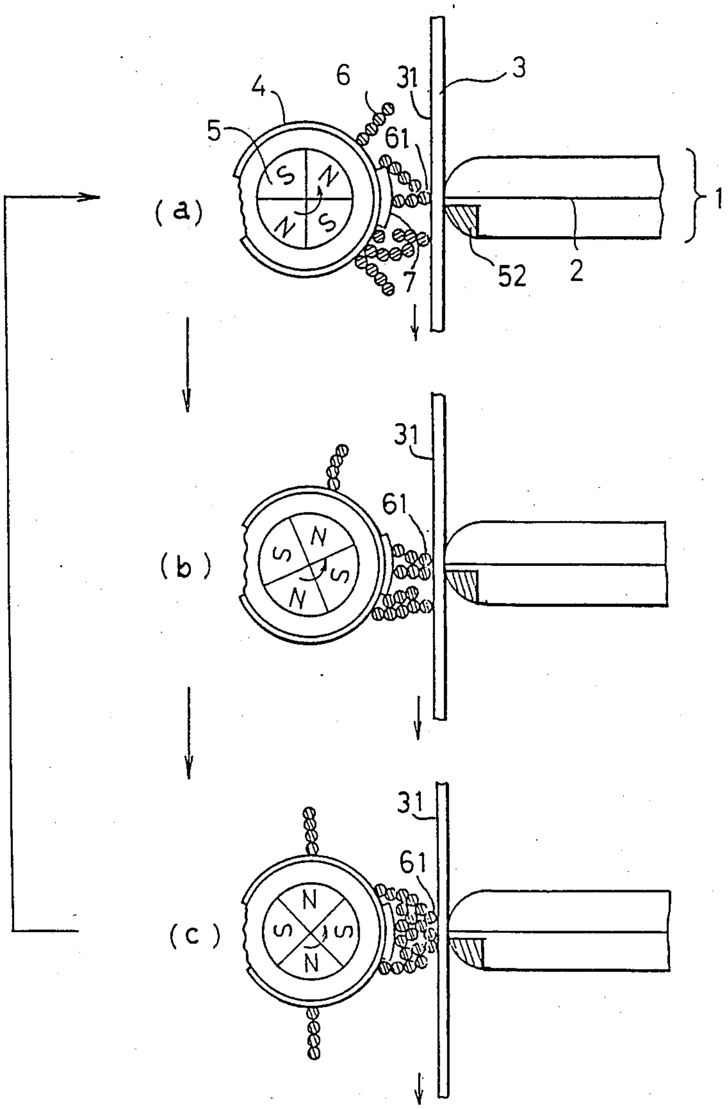
FIG. 7 illustrates schematically the movement of toner, preventing dot defects of an image using the present invention.

When the magnetic piece 52 is used for the recording electrode 1, the behavior of the magnetic toner 6 is illustrated schematically in FIGS. 7(*a*) through 7(*c*). With the rotation of the magnet roller 5, the magnetic toner 6 is attracted by a magnetic force and is transported on the sleeve 4 and then on the back electrode 7.

FIG. 7(*a*) shows of the condition that a boundary region between neighboring poles of a magnet roller 5 which faces the stylus electrode, and in FIG. 7(*c*), the center region of the S pole faces the stylus electrode. FIG. 7(*b*) shows the situation halfway between the situation in FIGS. 7(*a*) and 7(*c*).

Regardless of an angular position of the magnet roller 5, the top particles 61 of the magnetic toner chains touch the front side 31 of the recording medium 3.

The dimension d in FIG. 6 of less than 1.0 mm is preferable, in which case, the chains of the magnetic toner can stand upright comparatively easily in the narrow region between a fixed sleeve 4 and the recording electrode 1. The reason will be understood from the following consideration. When an iron piece is embedded in the recording electrode, the magnetic field pattern is illustrated in general in FIG. 8, which shows that the magnetic flux from an N pole concentrates on the edge 521 of the iron piece 52, and this makes the toner stand upright and touch the recording medium (not shown here). The dimension w is not so critical, it is sufficient if it is more than 4 mm.

The structure of the electrode in FIG. 6 shows satisfactory results with regard to the dot defects of the recorded image. However, as shown in FIG. 6, the recording medium 3 travels on the surface 522 of the magnetic piece 52 at all times during operation. The abrasive particles of the magnetic piece are thus liable to become stuck on a back side 32 of the recording medium 3, and the quality of the formed image gradually deteriorates. The defect to the image is irregular and distributed over the recording medium. This defect will be referred to as an irregular defect hereinafter.

Figure 9:
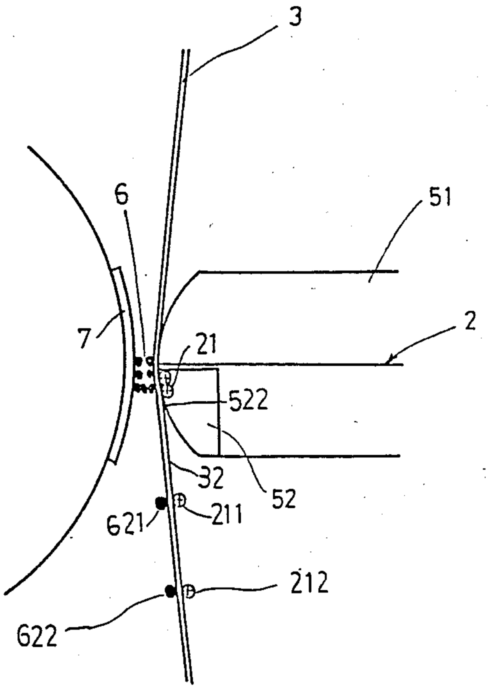
FIG. 9 is a cross-sectional view illustrating the movement of a toner particle and a charge on each side of a recording medium, which causes a fogging phenomena of an image.

Another problem arising from the structure of FIG. 6 is that when the signal voltage is applied to the back electrode 7, electric charge 21 is induced on a surface 522 of the magnetic piece 52 as shown in FIG. 9, because it is electrically conductive. The charge 21 is transferred on the back side 32 of the recording medium 3 and moves therewith (shown as charges 211 and 212 in FIG. 9) attracting charged toner 621 and 622. This causes a fogging phenomenon of the image on the recording medium.

Figure 10:
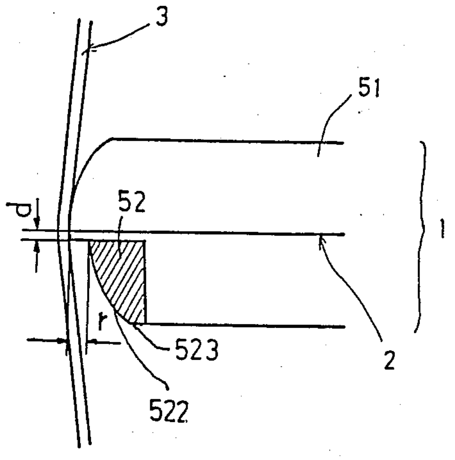
FIG. 10 is a cross-sectional view of a recording electrode of a second embodiment of the present invention, wherein a magnetic piece has the same form as that of FIG. 6 but is recessed from the tip of a recording electrode.

In a second embodiment, to avoid the above mentioned irregular defect and the fogging phenomenon, it is preferable to embed the magnetic piece in a recess in the tip of the recording electrode, and thus prevent the recording medium from touching with the magnetic piece as shown in FIG. 10.

A magnetic piece 52 is embedded, being recessed by a distance r from the top of the recording electrode 1 as wn in FIG. 10. Distance r is approximately 1 mm, for example, and the outer surface 522 of the magnetic piece 52 has the same curvature as that of the molding material on the opposite side. The structure of FIG. 10 avoids the abrasion of the magnetic piece 52 by the recording medium 3, and thus improves the quality of the image.

Several modifications in a shape of the magnetic piece of FIG. 10 are possible. One of the modifications is incorporated into a second embodiment, four types of which are shown in FIG. 11 through FIG. 14. The main reason for the modification is to make it easy to fabricate the magnetic piece. The magnetic piece 52 shown in FIG. 10, needs a complicated machining process to get a curved surface, however, types shown in FIG. 11 to FIG. 14, are easily fabricated by using a metal sheet.

Figure 11:
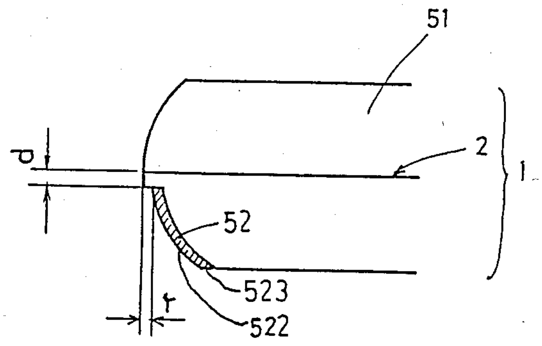
FIG. 11 is a cross-sectional view of a first modification of the recording electrode of FIG. 10, wherein the magnetic piece has a curved surface and is made from a sheet material.

The shape of the magnetic piece 52 of FIG. 11 has a curved surface 522 similar as that of the molding portion, but it is easily fabricated by press-work.

Figure 12:
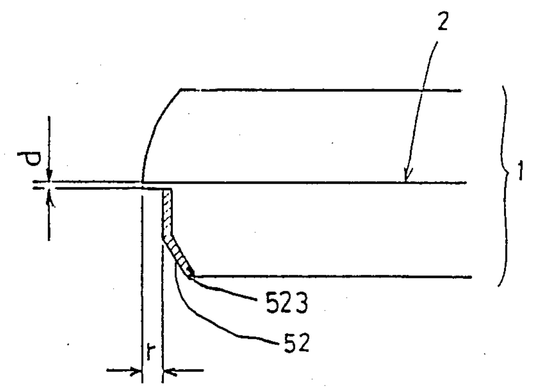
FIG. 12 is a cross-sectional view of a second modification of the recording electrode of FIG. 10, wherein the magnetic piece has the shape of an angle bracket.

The shape of the magnetic piece 52 of FIG. 12 is shaped like an angle bracket and is simple and easy to fabricate.

Figure 13:
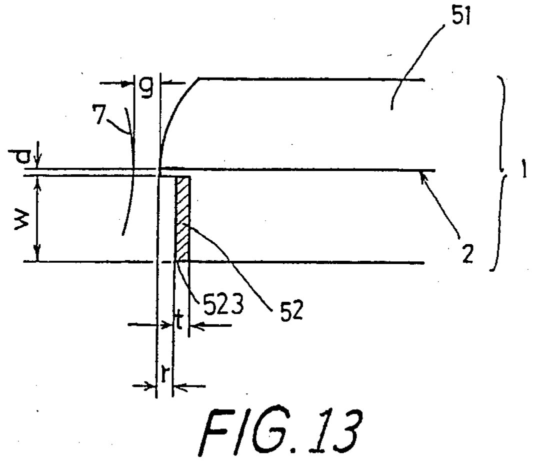
FIG. 13 is a cross-sectional view of a third modification of the recording electrode of FIG. 10, wherein the magnetic piece is punch-worked and embedded perpendicular to the plane of the stylus electrodes.

The simplest shape of the magnetic piece 52 is shown in FIG. 13, wherein a sheet metal piece is only punch-worked and embedded perpendicular to the plane of the stylus electrodes 2 as shown in FIG. 13.

Comparing FIGS. 11 and 12 with FIG. 13, the structures of FIGS. 11 and 12 have more clearance from the recording medium at the edge 523 than that of FIG. 13. Therefore, the structures of FIGS. 11 and 12 are more effective to improve the fogging phenomenon than that of FIG. 13.

Figure 14:
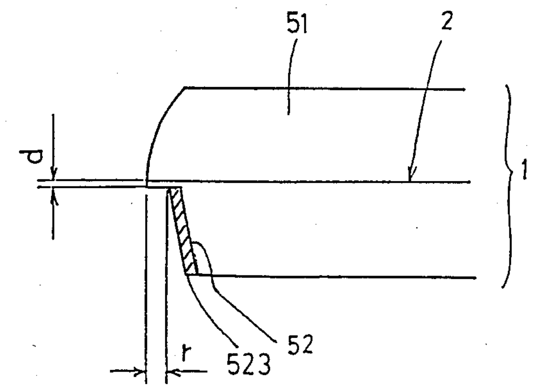
FIG. 14 is a cross-sectional view of a fourth modification of the recording electrode of FIG. 10, wherein the magnetic piece is tilted with respect to the plane of the stylus electrodes.

When a metal sheet is embedded and tilted as shown in FIG. 14, its function rather resembles to that of the magnetic piece of FIG. 11 or FIG. 12, which has the effect of improving the fogging phenomenon.

Reference characters g, d, r, w and t are referred respectively to the gap between the recording electrode 1 and the back electrode 7, the distance between the edge of the magnetic piece 52 and the stylus electrode 2, the dimension of recession, and the width and the thickness of the magnetic piece as shown in FIG. 13. The dimensions, which give a satisfactory recorded image, have been found experimentally as follows:

$g \leqq 1.0$ mm, $d \leqq 1.0$ mm, $r \leqq 1.5$ mm ($r \leqq 0.5$ mm is preferable), $w \leqq 4.0$ mm ($w \geqq 6.0$ mm is preferable), $t \geqq 0.5$ mm.

The above data was taken using an apparatus, comprising a fixed sleeve 4 of 32 mm outer diameter and a magnet roller 5 having 8 poles.

Figure 15:
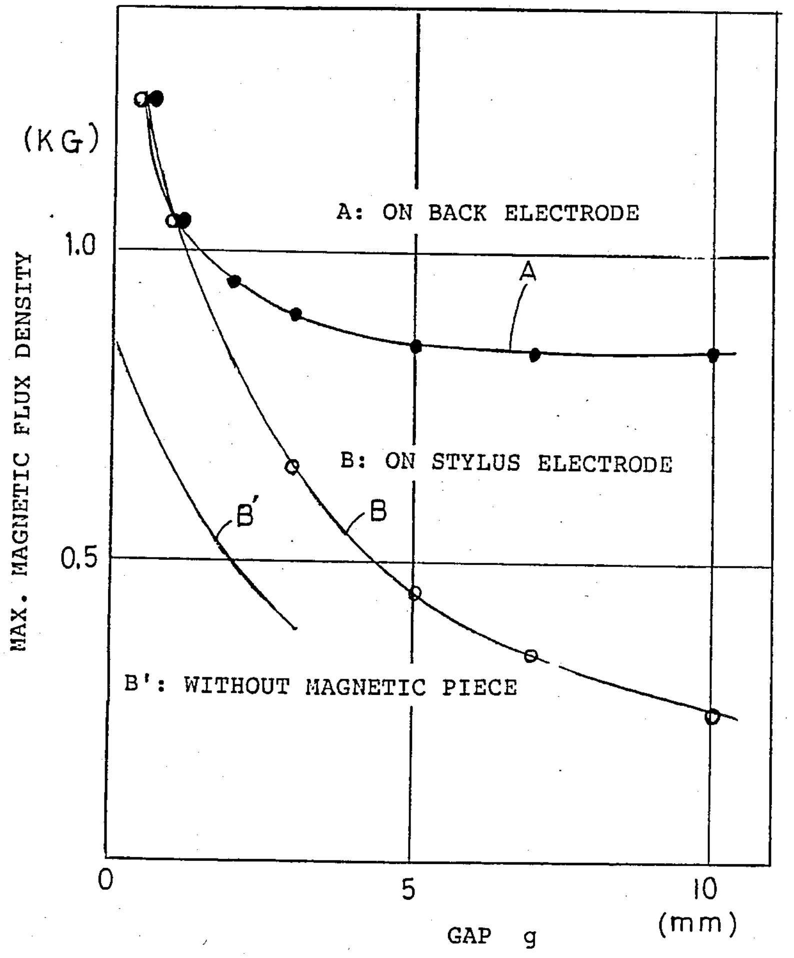
FIG. 15 is a graph showing the relation between the maximum magnetic flux density and a gap dimension g, wherein curve A shows data on the surface of a back electrode, curves B and B' show data on the tip of the stylus electrode with and without (the prior art) a magnetic piece respectively.

With regard to the gap dimension g, the maximum magnetic flux density is measured varying g. In FIG. 15, data of the magnetic flux density on the surface of the back electrode 7 is shown by curve A, and data on the tip of stylus electrode 2 is shown by curves B and B'. Curve B' shows the data when there is no magnetic piece 52 as in the prior art. Comparing curve B with B', the magnetic piece 52 has the effect of increasing the magnetic flux density by an amount of more than 500 G, when $g \leqq 1.0$ mm. With an increase of gap g, the magnetic flux density decreases rapidly on the tip of the stylus electrode, and therefore, the dimension g is preferable to be $g \leqq 1.0$ mm as described above.

Figure 16:
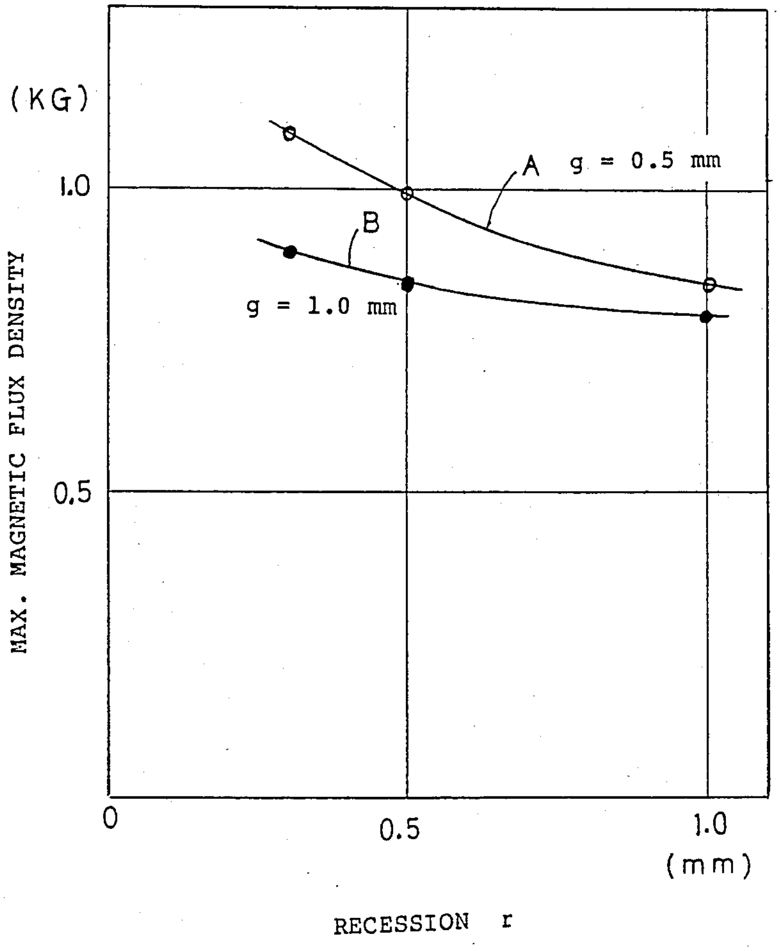
FIG. 16 is a graph showing the relation between the maximum magnetic flux density and the dimension of recession r of a magnetic piece from the tip of the recording electrcde, wherein curve A is for g=0.5 mm and curve B is for g=1.0 mm.

The data of the maximum magnetic flux density on the tip of the stylus electrode, varying the dimension r of recession, is shown in FIG. 16, wherein curves A and B are measured when $g=0.5$ and 1.0 mm respectively. The data shown in FIG. 16 discloses that $r \leqq 0.5$ mm is preferable to get a high quality image, because it is desirable that the maximum magnetic flux density on the tip of stylus electrode be close to 1.0 KG or more. However, maximum flux density depends greatly on other conditions such as a gap g, a width w, property of the toner, etc.

Figure 17:
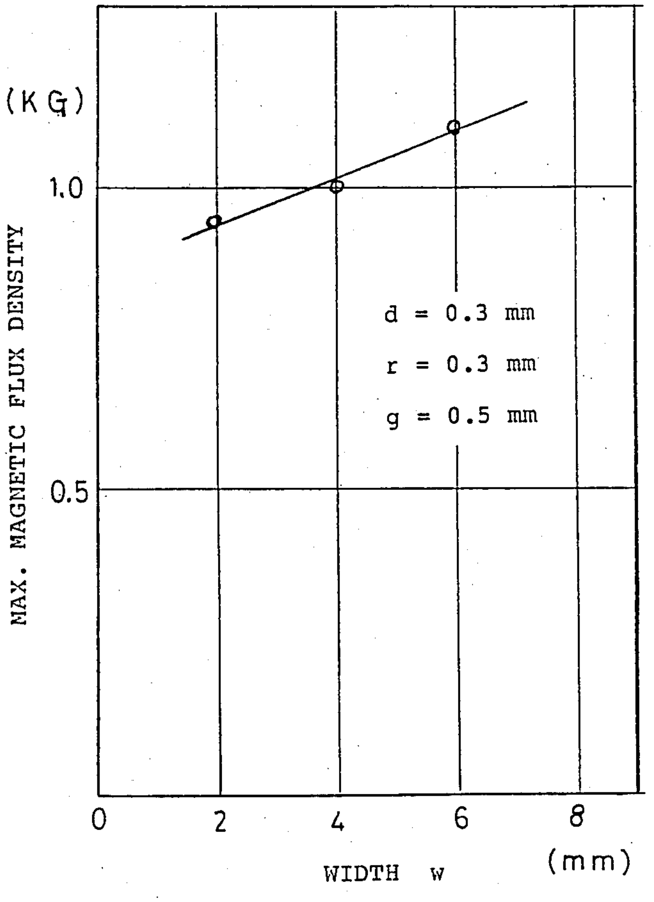
FIG. 17 is a graph showing the relation between the maximum magnetic flux density and a width w of a magnetic piece.

With regard to the dimension w, a length of greater than $\frac{1}{3}$ of the peripheral width of each pole, which composes the magnet roller, is necessary. An example of measured data of the maximum magnetic flux density on the tip of the stylus electrode is shown in FIG. 17 when $d=0.3$ mm, $r=0.3$ mm, and $g=0.5$ mm. As can be understood by the graph of FIG. 17, $w \geqq 4.0$ mm is preferable for the same reason as explained with regard to FIG. 16.

Figure 8:
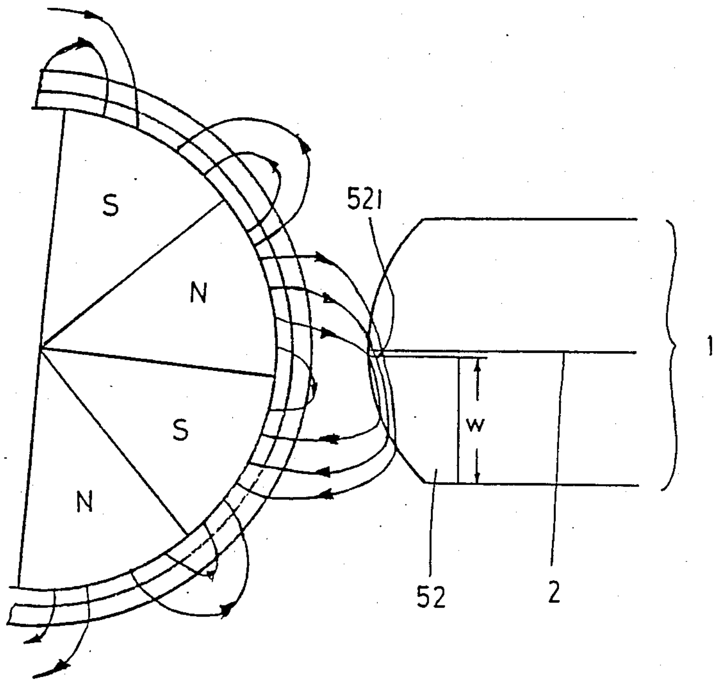
FIG. 8 shows schematically a magnetic field pattern in a gap region between a magnet roller and a recording electrode according to the present invention.

The thickness t is not so critical, and the magnetic flux density is almost constant when using a thickness of from 0.5 mm to 10 mm, because the magnetic flux concentrates on the edge and a gap side region of the magnetic piece 52, which may be analogized by FIG. 8. A sheet of soft magnetic iron having a thickness of 2 mm or less, for example, may be used for this purpose.

The data described above, which gives satisfactory results, is typical for the configuration of FIG. 13, however, the data can be easily modified and analogized for the application of the structure shown in FIGS. 10, 11, 12 and 14. These four types have more clearance between the recording medium 3 and the edge 523 of the magnetic piece 52 as compared to FIG. 13, and therefore, the chance of the recording medium 3 contacting the edge 523 is reduced. This improves the fogging problem.

Each representative structure of FIG. 10 through FIG. 14 has been tested for dot defects and irregular defects of the recorded image, and for fogging on the recorded paper etc., and is compared with the type of FIG. 6 without recession. The dimensions of design parameters g, d, r, w and t as described above have given satisfactory results in these tests.

Figure 18:
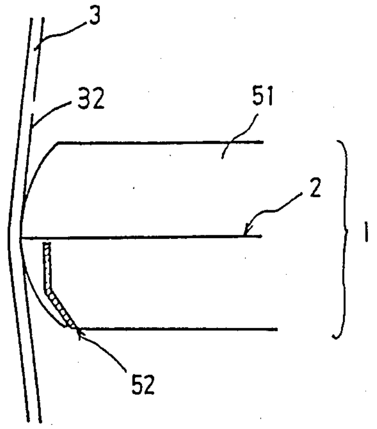
FIG. 18 is a cross-sectional view of the recording electrode for a third embodiment of the present invention, wherein a magnetic piece is embedded and buried in a molding material.

A third embodiment is shown in FIG. 18, wherein a magnetic piece 52 is embedded and buried in a molding material 51. In FIG. 18, a magnetic piece 52 of an angle bracket type as in FIG. 12 is used, however, the embodiment of FIG. 18 is also applicable for all other types such as FIG. 13 and FIG. 14.

The surface of the molded recording electrode has a smooth curvature symmetrical with respect to the stylus electrodes 2. With a travel of the recording medium 3, abrading particles of the molding material 51 stick on the back side 32 of recording medium 3, but the particles of the insulator do not result in a serious effect on forming an image on the recording medium.

The structure has another advantage, in that the charge transfer from the magnetic piece 52 to recording medium 3, which is explained in FIG. 9, is prevented by the insulating material 51, and thus the fogging of the image is alleviated.

A further advantage of this embodiment is to protect the back side 32 of the recording medium 3 from flaws during its travel caused by contact with the recording electrode 1.

The structure explained in the three embodiments described above, has one magnetic piece embedded or buried on one side of the stylus electrodes, however, the present invention is not restricted for this case only, but also may be applicable for two magnetic pieces on both sides of the stylus electrodes. This structure increases the magnetic flux in the gap region.

Figure 19:
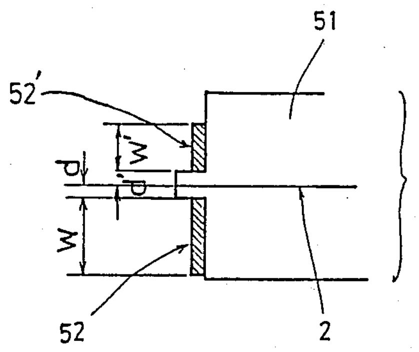
FIG. 19 is a cross-sectional view of the recording electrode for a fourth embodiment of the present invention, wherein two magnetic pieces are embedded on each side of the stylus electrodes.

A fourth embodiment, as shown in FIG. 19, has two magnetic pieces with one on each side of the stylus electrodes. Two magnetic pieces 52 and 52' are embedded in a top portion of the recording electrode 1, each being embedded on opposite sides of the stylus electrode 2.

The reference characters d, w, and d', w' for 52 and 52' respectively represent the similar dimensions used in the previous embodiments. In applying two magnetic pieces, the width w' is preferably from $\frac{1}{3}$ to 5/6 of w. If w' is selected almost equal to w, the dot defects of the formed image are observed. Assuming w is almost equal to w', and the tip of stylus electrode 2 just faces the boundary region between the poles of the magnet roller, then the magnetic fields from both poles of opposite polarities cancel out and decrease very substantially near the region of stylus electrode 2 and the toner chains are liable to fall. This causes the dot defects of the image.

Figure 20:
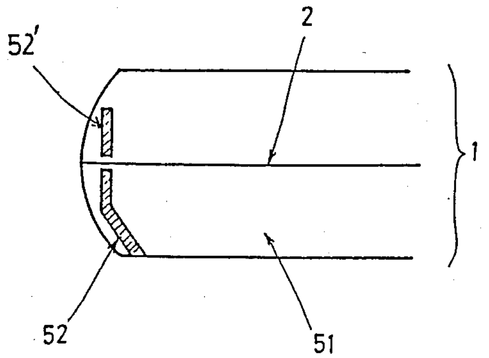
FIG. 20 is a modification of the structure of the recording electrode of FIG. 19, wherein the two magnetic pieces are buried in a molding material.

This embodiment may also be modified wherein two magnetic pieces 52 and 52' being embedded and buried in a molding material 51 as shown in FIG. 20. This structure has similar advantages as those of the third embodiment having one magnetic piece previously explained.

Another advantage of this embodiment is that the recording electrode is mechanically strong against deformation, because the two magnetic pieces are embedded on opposite sides of the stylus electrodes and the mechanical stress to the stylus electrode is balanced and reduced.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalence of the claims are, therefore, to be embraced therein.

We claim:

1. An electrostatic recording apparatus comprising:

a recording electrode means and a back electrode means for applying image signals therebetween, wherein said recording electrode and said back electrode are positioned with a predetermined gap therebetween, and wherein said recording electrode has a molded body and stylus electrodes embedded therein;

a magnetic brush means positioned adjacent a side of said back electrode opposite from said recording electrode means and including a rotatable magnet roller having a plurality of alternate magnetic poles on a surface thereof and a fixed cylindrical sleeve spaced from and concentric with said magnet roller, said magnetic brush means transporting a magnetic toner on said back electrode means positioned adjacent said cylindrical sleeve;

a recording medium movable through said gap between said recording electrode means and said back electrode means, said recording medium moving through said gap in contact with said recording electrode means and said recording medium being subject to a discharge from said recording electrode means which imparts a charge on a surface of said recording medium corresponding to said image signal; and a magnetic piece embedded in a tip portion of said recording electrode means, said magnetic piece influencing the magnetic flux paths originating from said magnetic roller and enhancing transfer of said magnetic toner from said back electrode means to said recording medium adjacent said tip of said recording electrode means regardless of the magnetic pole position of said magnetic roller relative to said tip of said recording electrode means.

2. An electrostatic recording apparatus according to claim 1, wherein said magnetic piece is a soft magnetic material.

3. An electrostatic recording apparatus according to claim 1, wherein said magnetic piece is embedded in one side of said recording electrode, adjacent to said stylus electrodes.

4. An electrostatic recording apparatus according to claim 3, wherein said magnetic piece is embedded in said recording electrode and recessed from the top thereof by a predetermined distance.

5. An electrostatic recording apparatus according to claim 1, wherein said magnetic piece is embedded in one side of said recording electrode, adjacent to said stylus electrode, and recessed from a top of said recording electrode by a predetermined distance, and wherein said magnetic piece is formed from a sheet of magnetic material.

6. An electrostatic recording apparatus according to claim 5, wherein said magnetic piece has a curved surface of the same curvature as that of the molded body of said recording electrode.

7. An electrostatic recording apparatus according to claim 5, wherein said magnetic piece is formed in an angle bracket shape.

8. An electrostatic recording apparatus according to claim 5, wherein said magnetic piece is embedded perpendicular to the plane of said stylus electrodes.

9. An electrostatic recording apparatus according to claim 5, wherein said magnetic piece is embedded and inclined with respect to the plane of said stylus electrodes.

10. An electrostatic recording apparatus to claim 5, wherein said magnetic piece is embedded and buried in said molded body.

11. An electrostatic recording apparatus according to claim 3, wherein said magnetic piece is embedded and is at a distance d of not more than 1.0 mm from said stylus electrode.

12. An electrostatic recording apparatus according to claim 4, wherein said magnetic piece is recessed not more than 1.5 mm from the top of said recording electrode.

13. An electrostatic recording apparatus according to claim 5, wherein said magnetic piece is at a distance of not more than 1.0 mm from said stylus electrode, is recessed not more than 1.5 mm from the top of said recording electrode, and has a width of not less than 4.0 mm and a thickness of not less than 0.5 mm.

14. An electrostatic recording apparatus according to claim 1, further including another magnetic piece wherein the magnetic pieces are embedded in parallel and on opposite sides of said stylus electrodes and are positioned asymmetrically with respect to the plane of said stylus electrodes.

15. An electrostatic recording apparatus according to claim 14, wherein one of said magnetic pieces have a width ranging from $\frac{1}{3}$ to 5/6 of the width of the other of said magnetic pieces.

16. An electrostatic recording apparatus according to claim 14, wherein said magnetic pieces are embedded and buried in said molded body.

* * * * *